Oct. 21, 1941.    W. N. PARKER    2,259,658
MODULATING SYSTEM
Filed June 10, 1936    5 Sheets-Sheet 2

Inventor:-
William N. Parker
by his Attorneys

Inventor:—
William N. Parker
by his Attorneys
Howson & Howson

Oct. 21, 1941.   W. N. PARKER   2,259,658
MODULATING SYSTEM
Filed June 10, 1936   5 Sheets-Sheet 4

Inventor:-
William N. Parker
by his Attorneys

Oct. 21, 1941.    W. N. PARKER    2,259,658
MODULATING SYSTEM
Filed June 10, 1936    5 Sheets-Sheet 5

Inventor:-
William N. Parker
by his Attorneys
Howson & Howson

Patented Oct. 21, 1941

2,259,658

UNITED STATES PATENT OFFICE 2,259,658

MODULATING SYSTEM

William N. Parker, Philadelphia, Pa., assignor, by mesne assignments, to Philco Radio and Television Corporation, Philadelphia, Pa., a corporation of Delaware Application June 10, 1936, Serial No. 84,534

48 Claims. (Cl. 179—171.5)

This invention relates to amplitude modulation of carrier signals, and more particularly, to a novel method and a novel system for this purpose. The invention is particularly adapted to wide-band modulation, that is, modulation of a carrier signal by a modulating signal whose frequency range is an appreciable portion of the carrier frequency. The invention is therefore useful, for example, in high definition television systems where wide-band modulation is essential.

One object of the invention is to provide an improved method and means for modulating a carrier signal whose frequency may be controlled by some precise means, such as a crystal-controlled oscillator.

Another object of the invention is to provide a novel system whereby wide-band modulation may be effected without objectionable side-band attenuation such as has heretofore been encountered.

A further object of the invention is to obtain wide-band amplitude modulation of a carrier signal by a system which may employ sharply tuned circuits in the power oscillator without materially affecting the frequency response of the system.

Still another object of the invention is to obtain amplitude modulation of a carrier signal by means characterized by high over-all efficiency and by minimum power dissipation in the modulating stage and associated stages.

A further object of the invention is to provide a net-work for obtaining a controllable variable resistance whose magnitude may be varied over a wide range at a high or low frequency rate in response to an electric signal.

Still another object of the invention is to provide such a controllable impedance whose range of variation may be controlled, and whose effective impedance may be caused to vary, in a certain relation with respect to the control signal.

Other objects and features of the invention will be apparent from the following description and the accompanying drawings in which.

Figure 1:
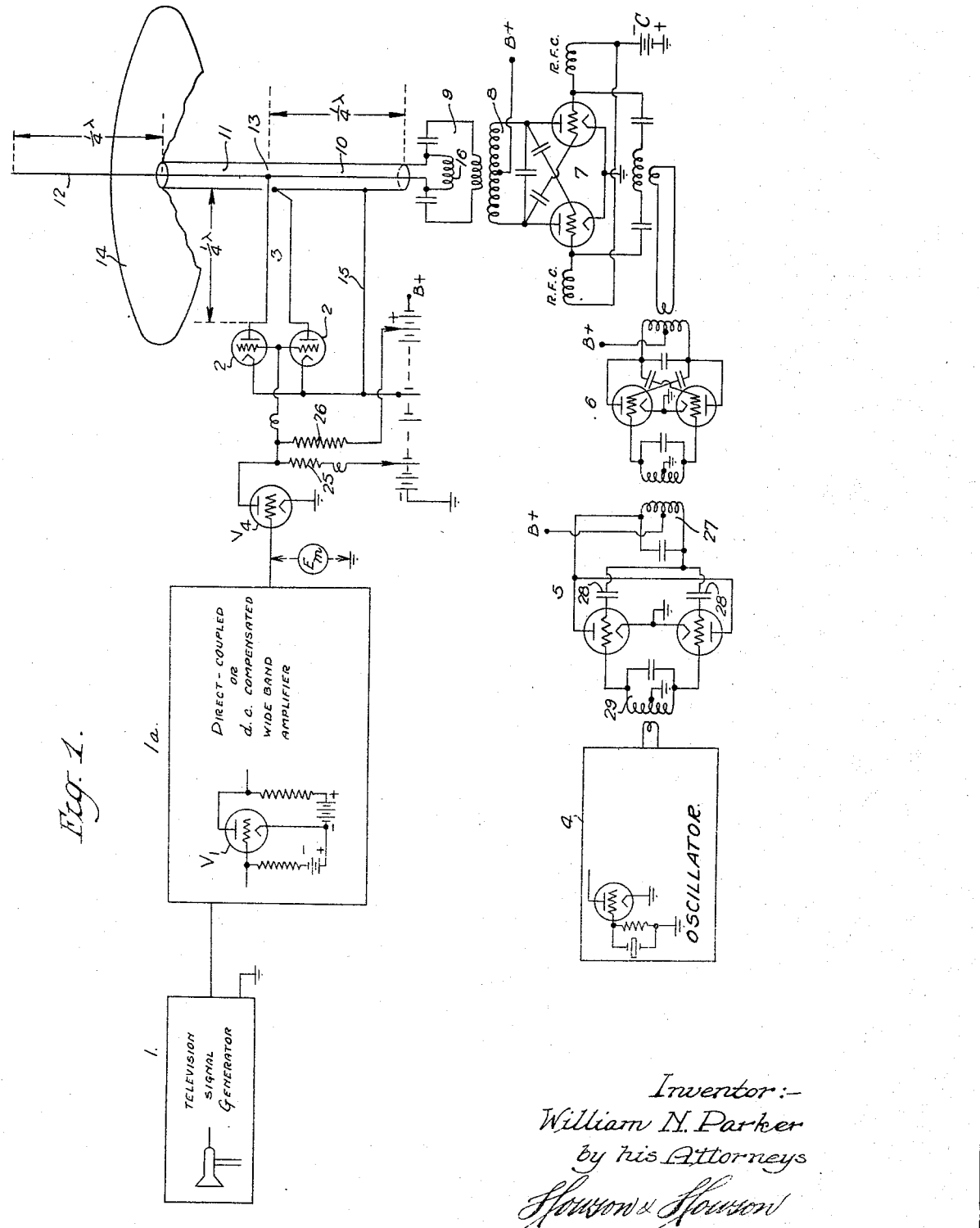
Fig. 1 is a schematic illustration of one embodiment of the invention.

In Fig. 1 is shown the circuit diagram of a device employing one embodiment of the invention, which may be used to modulate a high frequency carrier signal of the range employed in the television art with a modulating signal which might have been obtained from a television camera, and which might include the usual synchronizing signals and other signals employed in the transmission of television pictures. It will be understood, of course, that the invention is not limited to this particular use, but is generally suited for use in any instance where it is desired to modulate one wave signal by another.

In Fig. 1 there is shown a source of modulating or control signal comprising a television signal generator and its associated equipment $I$ and a modulating signal amplifier $Ia$. The control signal may in this particular instance include unidirectional current components, and a wideband conductively-coupled or D. C. compensated amplifier $Ia$ may be used. For simplicity, it may be assumed that the amplifier $Ia$ constitutes a source of a control $E_m$. The control signal is supplied by amplifier $Ia$ to a driver tube $V_4$, which may comprise one or more tubes in parallel, which in turn controls the grid voltage of the modulating or dissipator tubes $2$. The wideband amplifier may be of the type described and claimed in the copending application of Frank J. Bingley, Serial No. 51,324, filed November 23, 1935, which also shows a suitable signal source. The tubes $2$ are used as variable resistances whose average resistance during the carrier signal cycle is determined by their plate and grid voltage. The grids of tubes $2$ may in part be operated in the positive region and hence the shunt impedance of resistors $25$ and $26$ should be low as compared with the grid-to-cathode impedance of the tubes. The grid bias may be adjusted as indicated to a suitable operating point.

The cathodes and grids of tubes 2 are connected together and to the driver tube. The anodes, however, are connected to the load point 13 through an impedance inverter or quarter-wave transmission line 3. Each tube 2 will act as a half wave rectifier and the impedance inverter 3 will be terminated in a resistance determined by the plate-to-cathode resistance of the tubes 2 which resistance is controlled by the grid-to-cathode potential in the tubes. To provide for the rectification products, the two sides of the concentric line 10 may be connected together for unidirectional currents by the R. F. choke 16 and to the cathodes of tubes 2 by the lead 15. While it would appear that by this connection the plate and cathode of one of the tubes 2 are short-circuited, such is not the case since substantially all of the voltage which the modulating tubes are to modify is built up on the "quarter-wave" line 3 between the tube anodes and the coaxial cable.

At 4 there is shown a source of signal having a constant frequency, which source might, for example, comprise a crystal-controlled oscillator or any equivalent device. At 5 and 6, there are shown amplifying stages for this constant frequency signal which may, if desired, in these several stages, have its frequency doubled or tripled to obtain a signal of suitable amplitude and frequency to drive the power amplifier 7. The stage 5 shows a suitable form of a neutralized frequency doubling stage. This amplifier 7 may comprise a tuned class C amplifier stage. If desired, the stage 7 may itself comprise a power oscillator capable of oscillating at one frequency but I prefer to control the signal developed by stage 7 by means of some precision frequency source, as illustrated. In any event, across the tank circuit 8 of the amplifier stage 7 there is formed a source of signal of a single fixed frequency and, as will be pointed out in more detail hereinafter, of substantially constant root-mean square voltage amplitude.

The modulating means according to the invention comprises essentially a generator of signals of carrier frequency, which might be an oscillator and the tank circuit 8; means for modifying the character of this signal and for supplying it to a load point 13, which means includes the coupling circuit 9 and the "quarter wave" transmission line or "impedance inverter" 10; and a variable impedance for variably shunting the load point 13, the said impedance comprising the second "quarter wave" transmission line or "impedance inverter" 3 and vacuum tubes 2. The load point 13 constitutes the junction between the line 10 and the line 3. Signals developed across the junction or load point 13 may be supplied to a load impedance such as the antenna or radiator 12 by means of the transmission line 11. In general, modulation is accomplished by first disassociating the load point 13 from the generator or signal-supply means 8 in such manner that variations of the impedance at the point 13 will not reflect back to the generator in a manner to cause variations in the stored energy at the generator; and then shunting the junction or load point 13 by a modulating load which varies in a predetermined manner as a function of the modulating signal. In this manner, the voltage amplitude of signal at the load point 13 is caused to vary in accordance with the modulating signal, and the carrier signal thus modulated is transferred to the antenna and radiated into space, while the voltage across the tank circuit remains substantially constant.

In Fig. 1, a quarter-wave antenna, connected to the load point 13 through a matched transmission line 11, is shown. If desired a flat conducting surface, grounded for high frequency currents, may be positioned at the base of the antenna. In one embodiment from which satisfactory results were obtained, a concentric line having a characteristic impedance of 35 ohms was used to supply signal energy to a 35 ohm antenna. It will be apparent of course, that other types of antennas and feed lines might be used and that the modulated signal might be taken directly from the load point and used for any suitable purpose.

As will be apparent, by a quarter-wave line or quarter-wave antenna is meant a line or antenna having an effective electrical length substantially equivalent to a quarter-wave length of the wave signal. It will be understood, of course, that in any physical case, due to the effect of the line terminations, the physical length will differ somewhat from the theoretical electrical length, and generally will be somewhat shorter. The physical length corresponding to a quarter-wave length may be found by locating either current or voltage nodes when a signal of the desired frequency is impressed upon the line. Consecutive current or voltage nodes will be spaced two quarter-wave lengths apart, while a current node will be spaced a quarter-wave length from an adjacent voltage node.

Figure 2:
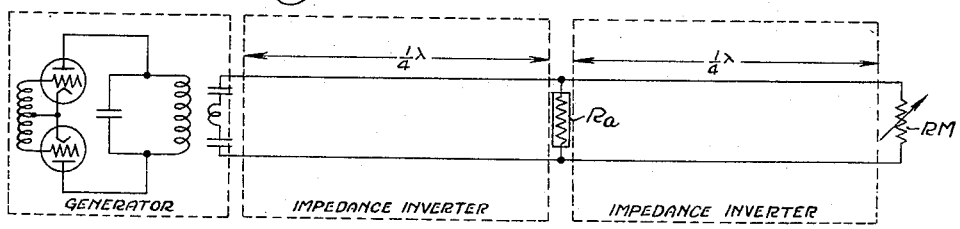
Fig. 2 illustrates schematically an idealized representation of the oscillator and modulator circuit of the invention.

The theory and operation of the modulating system of Fig. 1, as well as certain equivalent structures, may be more clearly understood by reference to Fig. 2, which shows a simplified schematic representation of the means by which the output signal may be modulated.

Referring now to Fig. 2, the system comprises essentially a signal generator, an impedance inverter connecting the generator to a load or output impedance $R_a$, and a second impedance inverter terminated in a variable resistance $R_m$, the second impedance inverter being connected across the terminals of the load or output impedance $R_a$. The variable resistance $R_m$ may correspond to the vacuum tubes 2 of Fig. 1, and the load $R_a$ may be the antenna and its associated feed line. The signal generator may correspond to the oscillator and R. F. amplifier of Fig. 1 and may comprise generally any means for forming a signal of a relatively constant frequency and amplitude. That this signal source should form a signal of constant amplitude is equivalent to saying that the equivalent series impedance of the generator is low. For the purposes of this specification and the appended claims, a "constant voltage source" will be defined as a signal source for providing a signal having a substantially constant root-mean square value of voltage magnitude or, equivalently, a signal source having a low equivalent series impedance as compared with other impedances in the system. Likewise, the term "constant current source" will be used and this will be defined as a source for supplying a current having a substantially constant root-mean square value of current magnitude or, equivalently, a signal source having a relatively high equivalent internal series impedance as compared with other impedances in the system.

An "impedance-inverter" may be considered to be a four terminal network having the characteristic of transforming a given impedance to an impedance substantially the reciprocal thereof. In other words, if a resistance R is connected to the two input terminals, when viewed from the other two or output terminals, this impedance R will appear as an impedance K/R where K is a proportionality factor for the network.

Hence in Fig. 2, there is provided a signal generator comprising, for example, a class C amplifier, which will be shown later to have a low series impedance, and connected to the generator is an impedance-inverter which forms at the load point $R_a$ a signal source having an equivalent series impedance inversely proportional to the series impedance of the generator, or in other words a signal source having a high equivalent internal impedance. At the load point, there is an impedance $R_a$ which may represent the impedance of any load, in this particular instance the impedance of the antenna and its associated feed line. This load is shunted by an impedance-inverter which in turn is terminated in a controllable resistance $R_m$, which may be the impedance of the controllable vacuum tubes 2. Designating the impedance of the dissipator tubes as inverted by the impedance-inverter connected to them, i. e. the impedance looking into the impedance-inverter from the load point, as the modulating impedance, there is then a load $R_a$ shunted by a modulating impedance, both of which are supplied with current from a constant current source. In other words, regardless of the combined impedance of the load and the modulating impedance, the total current supplied to the two will remain the same. The voltage amplitude developed across the load impedance, will, however, be proportional to the product of the current and the total equivalent impedance of the load and the modulating impedance in parallel. In other words, when the modulating impedance is zero, the voltage across the load will be zero, since a constant current flowing through a zero impedance produces no voltage thereacross. The zero modulating impedance would, of course, correspond to infinite $R_m$. On the other hand, if the modulating impedance were infinite, which would correspond to zero $R_m$, then all of the current would flow through the load $R_a$ and a maximum voltage would be developed thereacross. For intermediate values of modulating impedance, the signal voltage will vary accordingly. Thus, modulation of the signal supplied to the radiator is obtained by shunting the load with a variable modulating impedance and by varying the modulating impedance accordingly. It will be understood, of course, that the actual minimum and maximum modulating impedances will not be zero and infinity but some very small and some very large value respectively, depending upon the losses in the system. The lower the losses of the impedance-inverter, and in general the lower the losses elsewhere in the system, excepting the dissipator tubes, the greater the range over which the modulating impedance may be varied.

During modulation, the voltage across the tank circuit is substantially unchanged, but that component of current which is in phase with the voltage and thus supplies power to the load will, of course, vary as the amount of power absorbed by the total load varies. However, as will be shown later in more detail, this component of current may vary without requiring a change in voltage across the tank circuit provided the signal generator has a low equivalent series impedance. It is a further characteristic of such a system that if the generator has a low equivalent series impedance and if the load is connected to it by means of an impedance inverter then the voltage at the generator will remain substantially constant as the voltage across the load is varied and thus by means of the invention, a generator having a high Q tank circuit across its output may be employed without attenuation of the higher side bands, since the load voltage may be varied without varying the voltage across the tank circuit.

Considering the power relations, if $R_m$ is infinite, the total impedance shunting $R_a$ will be zero, the voltage on the antenna will be substantially zero, the power radiated will be substantially zero, and the power supplied by the ultimate source will be substantially zero, since nowhere in the system would there be under these conditions, any element having appreciable energy dissipation. Again if the resistance $R_m$ is zero, the effective shunting or modulating impedance (inverted $R_m$) will be substantially infinite, a maximum voltage will appear on the radiator, and corresponding maximum power will be radiated by the antenna. It will be noted, however, that under these conditions, the power absorbed by the modulating impedance will again be substantially zero, and hence all of the power supplied by the ultimate source will be effectively radiated. For intermediate conditions, the maximum power will be absorbed by the modulating impedance when it has a value substantially the same as the load impedance $R_a$. This would, in general, correspond to the case where the load signal voltage amplitude is one-half of the peak load signal amplitude, and in such case, the amount of power radiated would correspond to one-quarter of the maximum power output, and the amount of power absorbed by the modulator stage would correspond to one-quarter of the maximum power output. Thus, it will be seen that under these conditions, in the worst case, the amount of power absorbed by the modulating system does not exceed one-quarter of the maximum power capabilities of the system, and this absorption takes place only when the power radiated is low, and when it is desired to radiate a maximum amount of power from the system, the modulating stage absorbs no energy, which makes for efficient operation of the system as a whole.

Figure 3:
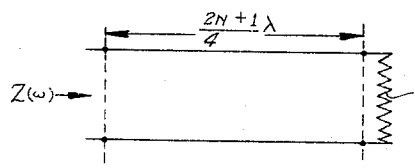
Figs. 3 and 4 are explanatory diagrams.

In Fig. 3, there is shown an impedance-inverter comprising a quarter-wave transmission line as described above.

Figure 4:
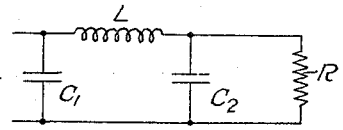

Similar useful results may be obtained by use of the lumped network shown in Fig. 4, where the resonant frequency of the network is taken to be that of the inductance L and one of the condensers $C_1$ and $C_2$.

While two types of impedance-inverters have been shown, the quarter-wave transmission line of Fig. 3 represents the preferred form, particularly where the invention is used for modulating a carrier signal of very high frequency, such as those employed in television practice. For such very high frequency signals, a quarter-wave length is a relatively short physical distance and hence a quarter-wave transmission line may be easily obtained. Such a line, will, in general, have lower losses than the equivalent lumped circuit. Further it is difficult at these very high frequencies to obtain an actual lumped network due to the physical size of the elements. In other words, the physical length of connectors required between the elements of the network tends to prevent it from behaving as a purely lumped system. It will, nevertheless, be understood that the lumped network may advantageously be used in systems wherein the carrier frequency is such as to make the physical length of a quarter-wave line inconvenient for use.

Considering the lumped circuit per se for the mement, it will be apparent that the condensers $C_1$ and $C_2$ may be replaced by inductances if the inductance be replaced by a condenser. Likewise, the present $\pi$ section could be replaced by its equivalent T section. Furthermore, while the condensers $C_1$ and $C_2$ of the present circuit should preferably be equal, this is not absolutely necessary and impedance-inversion may be obtained when $C_1$ and $C_2$ are not equal. In the latter case, however, the modulating impedance will no longer be largely resistive but will contain an appreciable reactive component whose magnitude will depend upon the terminating resistance.

A second feature contemplated by the invention is the transformation of the relatively high impedance of the pair of vacuum tubes down to a modulating impedance of a magnitude suitable for use as a controllable impedance associated with the load. As indicated in Fig. 1, the modulating impedance may be obtained by means of the two space discharge devices 2 connected as grid controlled dissipators, which constitute a controllable means for dissipating electrical energy. Such space discharge devices as are known at the present time, and are otherwise suitable for the purpose, however, are generally characterized by having a high internal resistance, and in order to obtain therefrom a controllable resistance of the same order of magnitude as that of the load, it is necessary to reduce this equivalent resistance by some means, such as any of the above described impedance-inverters. For these inverters the value of K, or the proportionality constant, may be varied over a wide range by adjustment of the relative values of (L or $l$) and C (or $c$). The $l$ and $c$ parameters of a line are, of course, determined by the diameter and spacing of the wires forming the line.

A third feature of the invention is the overcoming of the inherent capacitance between the several cathodes, grids and anodes of the dissipator tubes 2.

To obtain maximum efficiency, it is desirable that this capacitive reactance be counterbalanced by an equivalent amount of inductive reactance. In Fig. 1 this is done by shortening the modulating line 3 by a small amount, which will effectively introduce a small amount of inductive reactance that may be made to balance out the capacitative reactance of the tubes. It will be understood, of course, that the line 3 includes the leads to the actual tube anodes. The amount by which the line is shortened will depend, of course, on the tube construction. In one case in which commercial tubes were used the line was shortened by 20%.

Figure 10:
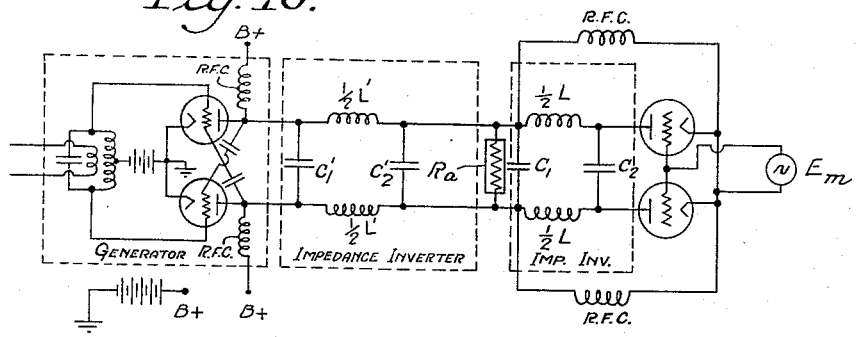
Fig. 10 illustrates a further embodiment of the invention.
Figure 12:
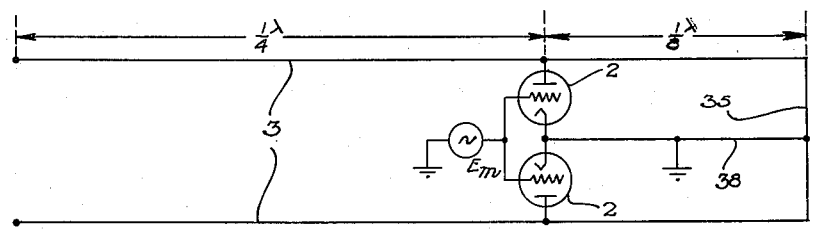
Fig. 12 illustrates a modification of a part of the invention.

Alternatively, the anodes of the tubes 2 might be shunted by an inductance of sufficient magnitude so that it will be resonant with the tube capacity at the carrier frequency, thus terminating the line 3 in a parallel resonant circuit shunted by a variable resistor. Preferably, however, this additional inductance may be obtained by adding to the system a short section of short-circuited line, as shown at 35 in Fig. 12, which will supply an inductive reactance having extremely small losses, thus forming as a terminating impedance, a parallel resonant circuit having a very high "Q." The short-circuited line may be an eighth wave length long. The connection 38 provides the low impedance path for rectification products. In Fig. 10 is shown a device similar to that shown in Fig. 1 except that impedance-inverters of the lumped constant type are used in place of the transmission line, and the generator is directly connected to the impedance-inverter. Modulation is accomplished by use of a pair of space discharge devices connected in push-pull relation similar to the connection in Fig. 1. It will be noted that the tank circuit of the generator has been removed and the impedance-inverter connected directly to the anodes of the class C amplifier. In this case the impedance-inverter will serve the purpose of the tank circuit as well as transforming the effective low impedance of the amplifier to a suitable high impedance source by which the load $R_a$ may be energized. As will be apparent, the anodes of the amplifier may be energized through radio frequency chokes. For the purpose of balancing the network, it is advisable to divide the impedance L of each impedance-inverter into two impedances, each having a value equal to one-half the desired inductance and providing one of these inductances in each branch. In this way a more symmetrical and better balanced circuit is obtained. Likewise, the two condensers $C_1$ and $C'_2$ of the two impedance-inverters which are in shunt with the load $R_a$ may be combined in a single condenser if so desired. A low impedance path for rectification products is provided by the connection of the cathodes of the dissipator tubes to the sides of the load through the radio frequency chokes R. F. C.

Figure 8:
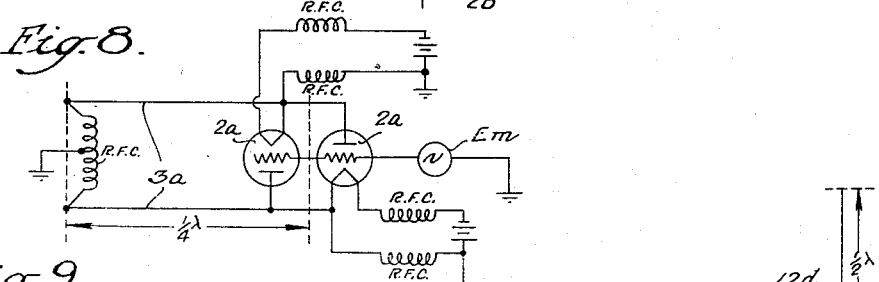
Fig. 8 illustrates a modification of the modulating impedance which may be used with any of the several embodiments of the system.

An alternative circuit for the dissipator tubes which may be used in place of the dissipator tube circuit of Fig. 1 is shown in Fig. 8. In this circuit the cathode of one tube and anode of the other are connected to one side of the line $3a$, while the anode of the first tube and the cathode of the second tube are connected to the other side of the line. Each tube cathode is energized from some convenient source, which may be a common source for both tubes, through leads which may include radio frequency chokes R. F. C. presenting extremely high impedance to the carrier frequency, and each tube filament circuit may be connected to ground as shown. In Fig. 8, a single filament supply battery may be employed by connecting such battery between ground and the center of the choke R. F. C. at the left of the figure, and by connecting one side of each filament to ground through a choke. In this case, as before, the grids of the two tubes may be connected together and the modulating signal may be applied between the grids and the filament circuit as indicated. This system is less desirable than that of Fig. 1 because a large carrier frequency voltage will appear between the grid and filament, necessitating a relatively large grid swing, whereas in the system of Fig. 1, the cathodes are effectively isolated from the R. F. signal by the control elements, thus permitting the use of a much smaller modulating signal. In Fig. 8 a symmetrical network is provided, but the cathodes of the tubes must be isolated from ground for currents of the carrier frequency, while in the symmetrical circuit of Fig. 1, which is balanced to ground, the cathodes of the tubes 2 may be grounded for such currents.

The approximate equivalent shunting impedance is given by $$\frac{Z_o^2}{R_m}$$

where $Z_0$ is the surge impedance or square root of the L/C ratio for the second impedance-inverter. The voltage amplitude of the radiated signal will be given by the following equation:

$$E_{load} = (I \cdot R_a) \frac{1}{\left(\frac{R_a}{Z_o^2}\right) R_m + 1}$$

where I is the current supplied to the load point. Since $R_a$, I and $Z_0$ are substantially constant, the load voltage amplitude will be determined by $R_m$.

Figure 6:
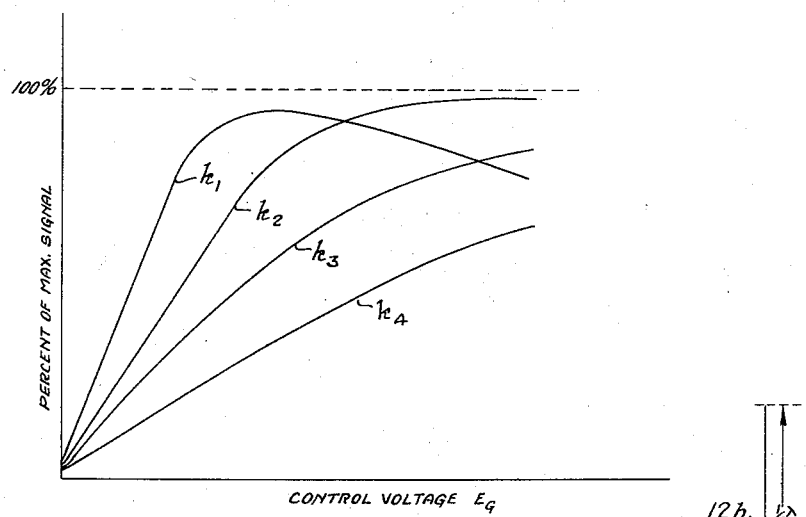
Fig. 6 illustrates the characteristic curves of the modulator under certain conditions.

While the equivalent impedance $R_m$ of the control tubes must vary in a non-linear manner with regard to the control voltage in order to obtain linear modulation of the carrier signal, fortunately, space discharge devices when used as indicated above, have a complementary relationship between the effective anode-to-cathode impedance and the control voltage applied to the control grid, and linear modulation is thus obtainable. This is indicated in Fig. 6 which shows the static relation between the control voltage applied between the grids and cathodes of the control tubes and the amplitude of signal radiated, for several degrees of coupling between the signal generator and the impedance-inverter connecting the generator to the loud point. On this graph, the abscissa represents grid voltage and the ordinate represents the ratio of radiated signal amplitude to the maximum signal amplitude obtainable when the modulator line is disconnected. Curves $k_3$ and $k_4$ are those obtained when the degree of coupling between the line and tank circuit is insufficient. The coupling is, of course, due to the common impedance in the tank circuit and the generator end of the impedance-inverter. For example, in Fig. 1, the common impedance is the mutual inductance between the tank circuit inductance and the coupling circuit inductance, while in Fig. 7, the common impedance is that portion of the tank circuit inductance in circuit with the line 10b. The degree of coupling will be proportional to the ratio of the common impedance to the square root of the two impedances of the two circuits, each including the common impedance. Critical coupling may be defined as that degree of coupling for which maximum energy is transferred to the load when the modulating impedance is a maximum. Curve $k_2$ is that obtained for critical coupling, the curve $k_1$ is that obtained from over-critical coupling.

It will be noted that in curve $k_1$, the signal amplitude reaches a maximum, and then falls off. This is due to the fact that the power source 7 is being overloaded. The efficiency of the amplifier falls off when this condition is reached. Preferably, the degree of coupling should be between that indicated by curve $k_1$ and $k_2$ by which maximum modulator sensitivity with minimum distortion is obtained. It will be noted in the curves of Fig. 6, especially curves $k_1$ and $k_2$, that the ratio between the radiated signal amplitude and voltage applied to the control grid is substantially constant almost to the top of the curve, at which point it falls off slightly. This slight non-linearity may easily be corrected by making the driving amplifier non-linear in such a way that the resultant of the curve of input voltage vs. output voltage for the non-linear amplifier and the particular operating curve $k$ would be more linear. This is accomplished in the amplifier 1a of Fig. 1, by suitably biasing the grid of an amplifier tube such, for example, as $V_1$ by means of the battery and taking advantage of the curved grid characteristic of the tube.

As will be seen from the above equation, the maximum signal radiated will be obtained when the modulating impedance, that is $$\frac{Z_o^2}{R_m}$$

is a maximum, a minimum signal radiated will be obtained when the modulating impedance is a minimum or in other words, when $R_m$ is a maximum, and one-half of the theoretical peak signal will be obtained when the modulating impedance is equal to the load impedance. From this, it may be shown that the maximum range of modulation for any physical circuit may be obtained when the geometrical mean of the maximum and minimum obtainable modulating impedance is substantially equal to the load impedance, and preferably the proportionality factor of the impedance-inverter network should be so adjusted that this condition is obtained. As indicated above this may be done by adjustment of the L/C ratio.

It may be proven that the amount of stored energy in the generator and coupling circuit will not vary to any appreciable extent as the modulating impedance is varied, particularly during short time intervals greater, however, than the period of the carrier signal. This follows from the fact that in a circuit such as that shown in Fig. 1, the plate-to-plate peak carrier frequency signal amplitude developed across the tank circuit will be approximately twice the difference between the plate supply voltage and the plate voltage required to obtain maximum space current when the grid is driven positive to a point where it no longer controls the space current, which is, of course, typical of correct class C operation. Of these voltages, the former is considerably larger than the latter for usual conditions of amplifier operation. In the circuit of the invention, the space current of the tubes will in part at least be determined by the modulator stage but the variation in output voltage caused by this current variation will be negligible if the amplifier is not overloaded, regardless of whether the amplifier is self-driven or driven from some other source. Such variation as does occur, however, may be helpful as outlined below.

Figure 5:
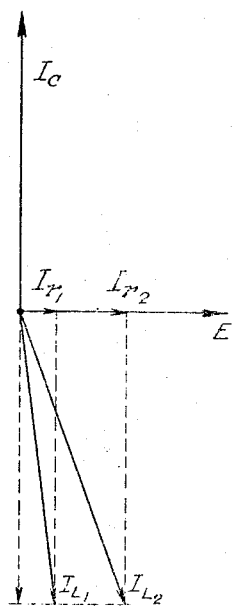
Fig. 5 is a vector diagram showing certain current and voltage relations in the output circuit of the source of oscillations.

In Fig. 5, there is shown the vector diagram of the current and voltage relations in the tank circuit 8. Since this is a parallel resonant circuit, it is convenient to take the voltage thereacross as a reference axis and the vector E has been so designated. The vector current $I_c$ in the capacitative branch will then appear as a vector leading by approximately 90°, neglecting losses in the condenser. The current in the inductive branch will then appear as a vector having a component equal in magnitude to $I_c$ but lagging the voltage by 90°. Since the current component due to radiation resistance, modulating resistance and losses in the several transmission lines, will then appear as part of the current in the inductive branch, the current which supplies these losses, which has been designated $I_{r1}$ will add to the reactive current, causing the current in the inductance to lag by somewhat less than 90°. The vector $I_{L1}$ illustrates the case where a small amount of power is being radiated, while the vector $I_{L3}$ illustrates the case where a larger amount is being radiated.

Considering now the output tubes of amplifier 1 and the tank circuit 8 as a unit, it will be noted, first, that the output current which determines the space current of the tubes will, in general, for steady state conditions, correspond to $I_r$ of the vector diagram, and second, that the actual out-of-phase circulating currents in the tank circuit will be of considerably greater magnitude than the plate current drawn by the output tubes. Consequently, the amount of stored energy in the tank circuit will be considerably greater than the amount of energy which may be imparted to the system during a single cycle of steady-state operation. Under the usual conditions of modulation of the prior art, it was customary to vary the voltage across the tank circuit in order to obtain modulation. Such a variation in voltage across the tank circuit required a large readjustment of the energies stored in the several points of the system and made it necessary to use a tank circuit having a relatively low "Q" or, in other words, having relatively high losses, in order to modulate the carrier signal over a reasonably wide frequency range. This has been a serious disadvantage in systems of the prior art. It will be noted, however, that by the present invention, the voltage across the tank circuit is maintained substantially constant and between the condition of maximum power radiation, as indicated by $I_{L2}$ in Fig. 5, and the condition of minimum power radiation, as indicated by $I_{L1}$ in Fig. 5, the actual variation in current in the tank circuit will not be appreciable, particularly if the voltage regulation thereacross is well maintained.

From the above description, it will be apparent that the magnitude of the current component $I_r$ may be varied without appreciably varying the voltage across the tank circuit. It is characteristic of a generator having a low effective series impedance, such as the "Class C" amplifier above described, that it will respond readily to variations of the in-phase component $I_r$ and will adjust itself to supply this component in proper magnitude as conditions require. The invention utilizes this characteristic by providing an impedance-inverter between the load point and the generator and by limiting the maximum possible impedance at the load point, which limits the minimum impedance reflected back to the generator. Thus due to the impedance-inverter, voltage variations at the load point do not cause voltage variations at the generator but do cause variations in the in-phase current component. However, these variations in the in-phase current component do not appreciably modify the voltage across the tank circuit and the generator including the tank circuit will readily adjust itself to them.

In the above explanation, it has been considered that the signal generator is a constant voltage source. If, however, this condition is modified by using a generator, whose output varies with the load, and including a tank circuit having a large predetermined energy storage capacity further useful results may be obtained. Under these conditions, the generator may be considered to be a constant voltage source for short time intervals, which, however, would be long as compared with the period of the carrier signal, so that the analysis given above is applicable; but for long time intervals comparable with the periods of signals of the modulating frequencies, the R. M. S. voltage of the source will vary more or less exponentially with time by a small amount as the generator adjusts itself to the new load conditions.

Figure 13:
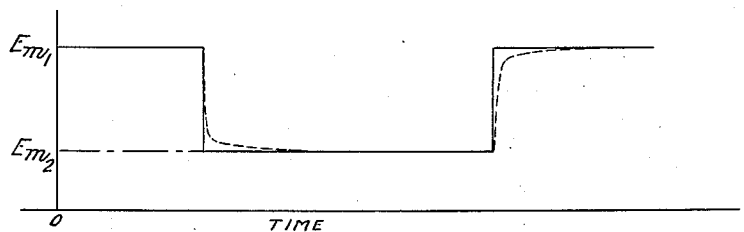
Figs. 13 and 14 are explanatory diagrams of certain characteristics of the invention.
Figure 14:
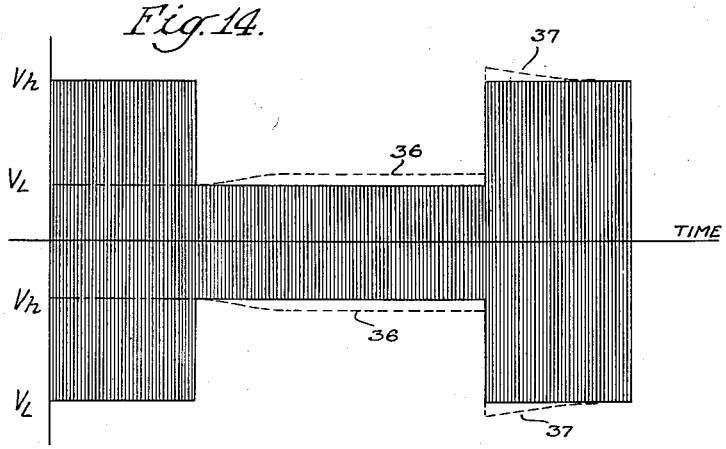

In practice, signal generators of the power capacity which might be used with the invention, generally have a drooping regulation characteristic, that is the output voltage may fall off by a small amount as the output varies from zero to full load. Referring to Figs. 13 and 14, if the modulating signal were such that the control voltage suddenly dropped from a value $E_{m1}$ to $E_{m2}$ (Fig. 13) such that $E_{m1}$ corresponded to a high value of radiated signal envelope say $V_h$ (Fig. 14) and $E_{m2}$ to a low value $V_L$, the carrier signal amplitude would change accordingly and the time required to change the carrier envelope from $V_h$ to $V_L$ would depend upon the high frequency response of the system. As mentioned above, the system of the invention has a very flat frequency response and consequently, this change would be completed in a very short time interval. Now, however, the load on the generator has been reduced and the envelope of the carrier signal would rise slightly as the generator voltage rose, as shown at 36 in Fig. 14. The amount of the rise will depend upon the generator regulation and the rate will be determined by the time required to change the stored energy in the tank circuit. If now the control voltage were to jump back to $E_{m1}$, the carrier envelope would rise to some value greater than $V_h$ due to the excess stored energy in the tank circuit and then gradually fall back to $V_h$ as this excess stored energy was used and as the generator readjusted itself to the steady-state condition, as shown at 37 in Fig. 14.

As indicated, the extent of this deviation of the carrier envelope from the modulating signal and the rate at which the deviation disappears, is determined by the regulation of the oscillator and the stored energy of the tank circuit. The latter is a function of the ratio of the inductance to the capacitance of the tank circuit, whereas the former is determined by the design of the generator and its plate supply source. It is characteristic of video-electrical converters (devices employed to translate visible light variations into an electrical signal) that, in general, the output signal will depart from the input signal in the opposite sense from the deviation outlined above. Consequently, the circuit of the invention may be designed to balance out variations in such signals and thus cause the carrier signal envelope to correspond more closely with that of the signal which it is desired to transmit.

For example, a visual input signal of rectangular shape, such as shown in Fig. 13 by the heavy line, would in conversion to an electrical signal by a video electrical converter be modified to have a somewhat different wave shape, for example, that shown by the dotted line. If this latter signal were applied to the invention as a modulating signal, the carrier envelope would be that shown by the heavy line in Fig. 14 due to the above-described characteristic of the invention, and thus the radiated signal envelope would correspond more closely to the initial input signal.

As will be apparent, the preferred values of regulation and L/C ratio for the tank circuit will depend upon the preceding amplifier system and more particularly upon its frequency characteristic since if desired, the above effect, which has been explained in terms of transients, may be expressed in terms of frequency response. However, it will be apparent that the two above-mentioned factors may be used to improve the frequency response of the modulator itself. It should be noted that the effect of the generator regulation and stored energy of the tank circuit is to modify the frequency response of the system, and should not be confused with the statements above made concerning non-linearity of the modulator and the means for compensating therefor.

Figure 7:
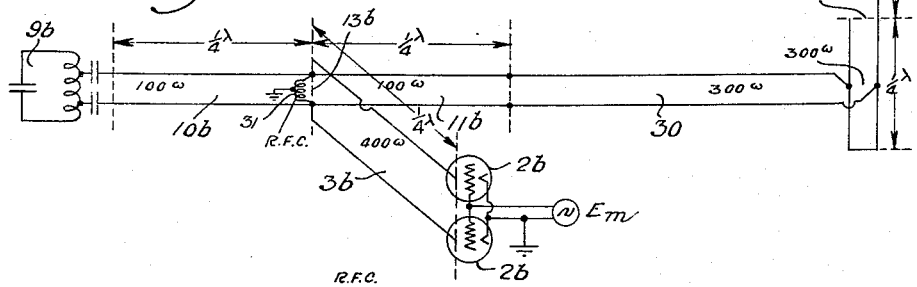
Fig. 7 illustrates another embodiment of the invention.

The invention is capable of many variations. For example, in Fig. 7, I have shown in schematic outline a system in which the antenna 12b may comprise a half-wave J antenna. The input impedance of such half-wave antenna when fed from the one end will be quite high, for example, between 2000 and 4000 ohms. This impedance may be transformed down by means of the quarter-wave short-circuited line connected to the bottom of the half-wave antenna and forming the lower part of the J structure. The antenna may be energized by a feed line connected to a suitable point on the lower part of the J structure, the input impedance depending upon the displacement of the coupling from the shorted end. In Fig. 7, I have indicated a point disposed between the shorted end and the bottom of the half-wave antenna, and the impedance looking into the antenna at this point might, for example, be 300 ohms. The feed line 3a of any length may likewise have a characteristic impedance of 300 ohms and may be connected by a quarter-wave line 11b to a load point 13b. Assuming that it is desirable to have the antenna appear at the load point as an impedance of say 33 ohms, then the quarter-wave line 11b may have a characteristic impedance of 100 ohms, which would serve to transform the equivalent impedance of the antenna down to the desired 33 ohms. The load point 13b may be connected to the tank circuit 9b of the oscillator through any suitable coupling. For example, I have shown a line 10b which may have a characteristic impedance of 100 ohms and which may be capacitively coupled to the tank circuit at such point as to obtain optimum coupling as indicated above. It will be understood, of course, that the portion of the tank circuit across which the line is coupled will depend upon the surge impedance of the impedance-inverter connecting the tank circuit to the load point and will be smaller for a lower surge impedance. Likewise the degree of coupling will be proportional to the size of the said portion. The load point 13b may likewise be connected to modulating tubes 2b by means of an impedance-inverter, and I have shown here the use of a transmission line 3b which may, for example, have a characteristic impedance of say 400 ohms. The load point may be shunted by a radio frequency choke coil 31 having a very high impedance at the carrier frequency, and the center tap of this choke coil may be connected to ground to provide a return path for the rectification products of the modulating tubes 2b whose cathodes may likewise be connected to ground. It will be understood, of course, that many other variations and modifications may be employed without departing from the invention.

Figure 11:
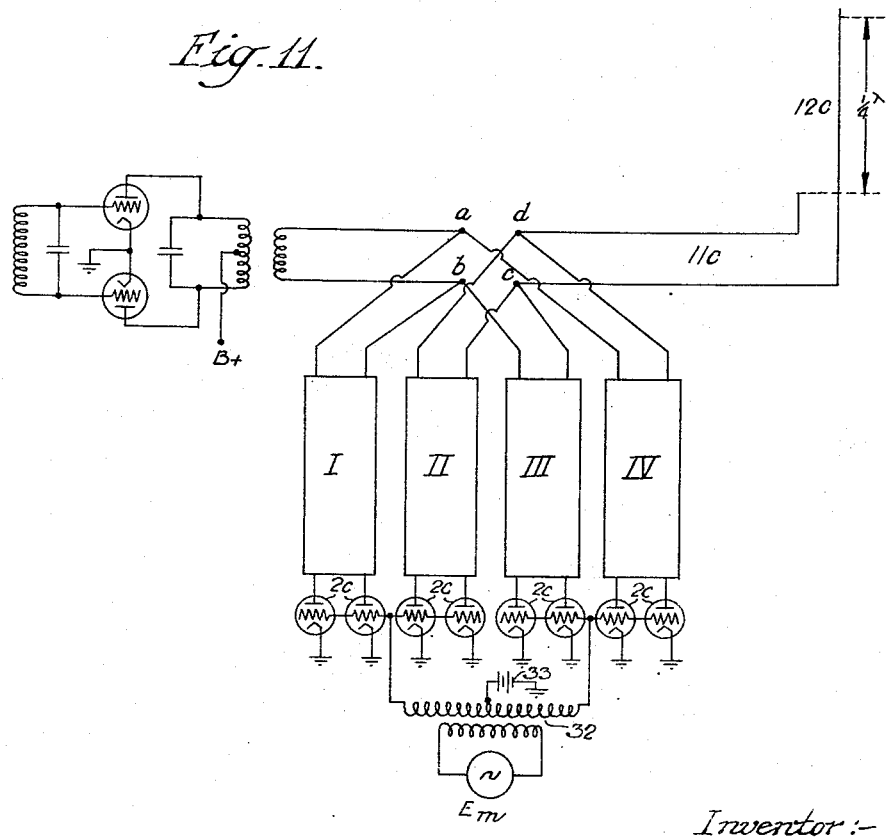
Fig. 11 illustrates a still further embodiment of the invention.

In Fig. 11, there is shown a modification of the invention in which the load point a, b is shunted by an impedance-inverter I, the point a is connected to a point d through an impedance-inverter IV, the point b is connected to a point c through an impedance-inverter III, the points c and d are shunted by an impedance-inverter II, and the antenna 12c is connected to the points c and d through its feed line 11c. It will be seen that the impedance-inverters III and IV constitute transfer impedances connected between the signal source and the output impedance, while the impedance-inverters I and II constitute shunt impedances connected respectively across the signal source and the output impedance. Thus, in this instance the load point a, b is shunted by one modulating resistance and the load is connected to the load point through two additional modulating impedances and is likewise shunted by still another modulating impedance. In this manner, the oscillator may be designed to work into a constant impedance load, the antenna feed line may be terminated in the constant impedance, and the amplitude of the signal supplied to the radiator may be varied at will by variation of the modulating impedances, while the amplitude of signal supplied by the oscillator is unchanged. In a network of this sort, the impedances presented by the inverters I and II, that is, the modulating impedances in shunt with a, b and c, d respectively, should be proportional to each other and the impedances presented by the inverters III and IV, that is the modulating impedances serially connected to b, c and a, d respectively, should be proportional to each other and properly related to the two previously mentioned modulating impedances. This may be done by connecting together the control grids of all four tubes 2c associated with inverters I and II, and likewise connecting together the control grids of the corresponding four tubes terminating inverters III and IV, and by supplying a control signal to the two groups through a push-pull circuit, as illustrated, so that when the grids of the tubes associated with inverters I and II are made more positive, the signal applied to the grids of the tubes associated with the inverters III and IV become more negative. This may be done by obtaining the two control signals from the opposite ends of the secondary of a transformer 32 having a center tap which is connected to the cathodes of all the tubes through a biasing battery 33 of such magnitude that a suitable operating point is obtained.

Figure 9:
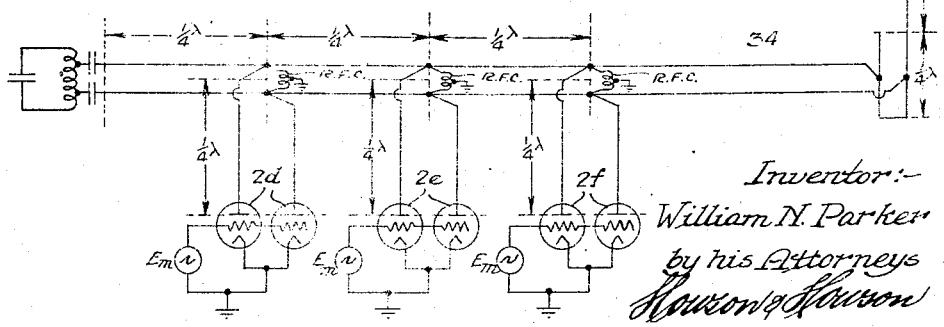
Fig. 9 illustrates another embodiment of the invention.

The invention is not limited to the use of a modulating impedance or impedances at one point in the system. A plurality of modulating impedances may be positioned at spaced points in the system, as illustrated in Fig. 9. The modulators 2d, 2e and 2f are connected at spaced quarter-wave points in the order named along the feed line 34 to the radiator 12d. It will be noted that if the modulating impedances are energized by a signal such that they present a very high impedance, then the amplitude of signal radiated may be controlled by varying either modulator 2d or 2f. If, on the other hand, modulator 2d is supplied with a control signal such that its impedance is small, then the signal at the load point of modulator 2e will have a constant current characteristic, and the amplitude of signal may be controlled downward from this value by varying the control signal applied to modulator 2e. Modulators 2d and 2f may be used together or independently of each other, regardless of the signal supplied to modulator 2e. If desired, the modulator 2e may be omitted in certain instances. Likewise, it will be understood that a plurality of dissipators might be spaced at half-wave points on a line an odd number of quarter-wave lengths long used as an impedance-inverter between the dissipators and the load point.

The use of multiple modulating means offers certain advantages in a television system. In general, in present television practice, it is customary to use a certain range of radiated signal amplitude to transmit the video signal and the remaining portion to transmit synchronizing signals. For example, the range of signal amplitude from 30% to 100% of the maximum radiated signal possible may be devoted to the video signal, while the range of signal amplitude from zero % to 30% may be used for synchronizing signals. Such a system permits separation of the video and synchronizing signals at the receiver by amplitude selective means. Heretofore, it has been the practice to combine the video and synchronizing signals at the studio by means of a special amplifier by which a composite signal is obtained, which signal is then used as a modulating signal. By the use of a multiple modulation system, however, it is possible to supply the video signal to one modulator while the synchronizing signal is supplied to another modulator, and in this way the use of a special combining amplifier is eliminated. For example, the first and second modulators of Fig. 9 might be used to provide such a modulated signal. In this case, the video signal might be supplied to modulator 2d, and the voltage level of the video signal might be so arranged that during the interval in which synchronizing pulses are sent out, the modulator 2d is energized so as to present a minimum impedance. In the present system this would be obtained if the video signal were constant at some minimum voltage during the interval in which synchronizing pulses are transmitted and if the video signal voltage were always greater than this minimum voltage during the intervals in which the video signal per se is transmitted. In this way, the first modulator 2d might, for example, control the amplitude of signal radiated from 100% down to 30% of the maximum signal radiated. The synchronizing signal might be applied to the second modulator 2e and might be such that during the interval in which the video signal is transmitted, the modulating impedance would be high, that is the synchronizing signal voltage would be most positive during that interval, while during the interval in which the synchronizing pulses are transmitted, the modulating synchronizing signal voltage would become less positive or more negative. In this way, the modulating impedance of the second modulator 2e would be very high during the interval in which video signals are transmitted and consequently, would have little effect upon the formation of the modulated carrier during this interval, while during the interval of transmission of synchronizing pulses, the carrier level would be cut down to 30% by modulator 2d and further reduced in accordance with the synchronizing signal by modulator 2e. Video and synchronizing signals, suitable for use in the multiple modulation means above described, might be obtained from any conventional television studio equipment; for example, signals obtained by means of the devices and circuits described in the aforementioned Bingley application would be suitable for this purpose.

For the purposes of this specification and the claims, an impedance-inverter is defined as a four-terminal network of lumped or distributed passive reactive elements, wherein the measurement of impedance at the operating frequency at the input terminals when the output terminals are short-circuited indicates an infinite resistance (neglecting losses) and wherein a similar measurement when the output terminals are open indicates zero resistance, and wherein the variation of measured resistance is continuous with variation in the resistance across the output terminals.

It will be understood from the above description that the system of Fig. 1 represents the preferred embodiment of the invention while the systems of Figs. 9 and 11 are modified forms. It will be understood also that in these several systems, either of the impedance-inverting devices of Figs. 3 and 4 may be used, and it is also optional to employ any of the features illustrated in Figs. 7, 8, 10 and 12. The diagrammatic illustrations of Figs. 1, 9 and 11 are, therefore, intended to represent embodiments of the invention including any of the several features of the other figures mentioned.

In the following claims the term "high frequency" is used only to distinguish the carrier frequency from the relatively lower frequency of the modulating or control signal.

The invention is capable of further embodiments and is not to be limited to those herein described. Any such forms, therefore, as fall within the scope of the claims are to be deemed within the scope of the invention.

I claim:

1. In a modulating system, means having a certain equivalent internal series impedance for providing wave signal energy, impedance-inverter means having an input circuit coupled to said first means and having an output circuit forming a source of wave signals having an equivalent internal series impedance higher than said first-mentioned impedance, a load connected to said source and having a resistance less than the said internal impedance of said source, a modulating impedance in shunt with said source, capable of being varied from a value greater than said load resistance to a value less than said load resistance, and means for varying the value of said modulating impedance to vary the amplitude of the signal voltage across said shunt impedances without substantially varying the input signal voltage of said impedance-inverter means.

2. In a modulating system, means having a certain equivalent internal series impedance for providing wave signal energy, impedance-inverter means having a certain surge impedance and having an input circuit coupled to said first means and having an output circuit forming a source of wave signals having an equivalent internal series impedance higher than said first-mentioned impedance, a load connected to said source and having a resistance less than the said internal impedance of said source and substantially matching said surge impedance, a modulating impedance in shunt with said source, capable of being varied from a value greater than said load resistance to a value less than said load resistance, and means for varying the value of said modulating impedance to vary the amplitude of the signal voltage across said shunt impedances without substantially varying the input signal voltage of said impedance-inverter means.

3. In a modulating system, means having a certain equivalent internal series impedance for providing wave signal energy, impedance-inverter means having an input circuit coupled to said first means and having an output circuit forming a source of wave signals having an equivalent internal series impedance higher than said first-mentioned impedance, a load connected to said source and having a resistance less than the said internal impedance of said source, an impedance-inverter having an input circuit and an output circuit, said input circuit being connected in shunt with said source and forming a modulating impedance capable of being varied from a value greater than said load resistance to a value less than said load resistance, and variable energy-dissipative means connected to said output circuit for varying the value of said modulating impedance to vary the amplitude of the signal voltage across said shunt impedances without substantially varying the input signal voltage of said first impedance-inverter means.

4. In a modulating system, means having a certain equivalent internal series impedance for providing wave signal energy, impedance-inverter means having a certain surge impedance and having an input circuit coupled to said first means and having an output circuit forming a source of wave signals having an equivalent internal series impedance higher than said first-mentioned impedance, a load connected to said source and having a resistance less than the said internal impedance of said source and substantially matching said surge impedance, an impedance-inverter having an input circuit and an output circuit, said input circuit being connected in shunt with said source and forming a modulating impedance capable of being varied from a value greater than said load resistance to a value less than said load resistance, and variable energy-dissipative means connected to said output circuit for varying the value of said modulating impedance to vary the amplitude of the signal voltage across said shunt impedances without substantially varying the input signal voltage of said first impedance-inverter means.

5. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, said impedance-inverter having a surge impedance, a load system having an impedance substantially matching said surge impedance and coupled to said high frequency signal source, variable impedance means and means responsive to a control signal for varying the effective impedance of said means, said variable impedance means being coupled to said high frequency signal source for varying the amplitude of the output signal.

6. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, said impedance-inverter having a surge impedance, an output impedance having a value substantially matching said surge impedance and coupled to said high frequency signal source, variable impedance means and means responsive to a control signal for varying the effective impedance of said means, said variable impedance means being coupled to said high frequency signal source and said output impedance for varying the amplitude of the output signal.

7. In an electrical system, a generator of a high frequency signal of one frequency, said generator having a certain effective internal impedance, and including a resonant circuit tuned to said frequency, an impedance-inverter coupled to said resonant circuit for forming a high frequency signal source having an effective internal impedance substantially inversely proportional to the effective internal impedance of said generator, said impedance-inverter having a surge impedance, an output impedance having a value substantially matching said surge impedance and coupled to said high frequency signal source, variable impedance means and means responsive to a control signal for varying the effective impedance of said means, said variable impedance means being coupled to said high frequency signal source for varying the amplitude of the output signal.

8. In an electrical system, a generator of a high frequency signal of one frequency, said generator having a certain effective internal impedance, and including a resonant circuit tuned to said frequency, an impedance-inverter substantially critically coupled to said resonant circuit for forming a high frequency signal source having an effective internal impedance substantially inversely proportional to the effective internal impedance of said generator, said impedance-inverter having a surge impedance, an output impedance having a value substantially matching said surge impedance and coupled to said high frequency signal source, variable impedance means and means responsive to a control signal for varying the effective impedance of said means, said variable impedance means being coupled to said high frequency signal source for varying the amplitude of the output signal.

9. In an electrical system, a generator of a high frequency signal of one frequency, said generator having a certain effective internal impedance, an impedance-inverter coupled to said generator for forming a high frequency signal source having an effective internal impedance substantially inversely proportional to the effective internal impedance of said generator, said impedance-inverter comprising a transmission line having a surge impedance and having an effective electrical length substantially equal to an odd number of quarter wave lengths of said signal, an output impedance having a value substantially matching said surge impedance and coupled to said high frequency signal source, variable impedance means and means responsive to a control signal for varying the effective impedance of said means, said variable impedance means being coupled to said high frequency signal source for varying the amplitude of the output signal.

10. In an electrical system, a generator of a high frequency signal of one frequency, said generator having a certain effective impedance, an impedance-inverter coupled to said generator for forming a high frequency signal source having an effective internal impedance substantially inversely proportional to the effective internal impedance of said generator, said impedance-inverter including a plurality of reactive elements substantially resonant at the signal frequency, an output impedance coupled to said high frequency signal source, variable impedance means and means responsive to a control signal for varying the effective impedance of said means, said variable impedance means being coupled to said high frequency signal source for varying the amplitude of the output signal.

11. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, said impedance inverter having a surge impedance, an output impedance, signal transfer means connecting said high frequency signal source and said output impedance and forming an equivalent load impedance having a value at said source substantially matching said surge impedance, variable impedance means and means responsive to a control signal for varying the effective impedance of said means, said variable impedance means being coupled to said high frequency signal source for varying the amplitude of the output signal.

12. In an electrical system, a generator of a high frequency signal, said generator having a low effective internal series impedance, an impedance-inverter coupled to said generator for forming a high frequency signal source having a high effective internal series impedance, said impedance-inverter having a surge impedance, an output impedance having a value substantially matching said surge impedance and coupled to said high frequency signal source, variable impedance means and means responsive to a control signal for varying the effective impedance of said means, said variable impedance means being coupled to said high frequency signal source for varying the amplitude of the output signal.

13. In an electrical system, means for generating a high frequency signal of one frequency, comprising a source of signal energy having a low equivalent internal series impedance and a resonant circuit tuned to said frequency for storing signal energy, said generator means having predetermined load voltage and energy storage characteristics, an impedance-inverter coupled to said generator means for forming a high frequency signal source having an effective internal series impedance substantially inversely proportional to the effective internal impedance of said generator means and a predetermined energy storage characteristic, said impedance-inverter having a surge impedance, an output impedance having a value substantially matching said surge impedance and coupled to said high frequency signal source, variable impedance means and means responsive to a control signal for varying the effective impedance of said means, said variable impedance means being coupled to said high frequency signal source for varying the amplitude of the output signal.

14. In an electrical system, means for generating a high frequency signal of one frequency, comprising a source of signal energy having a low equivalent internal series impedance and a resonant circuit tuned to said frequency for storing signal energy, said generator means having a drooping regulation characteristic and a predetermined energy storage characteristic, an impedance-inverter coupled to said generator means for forming a high frequency signal source having an effective internal series impedance substantially inversely proportional to the effective internal impedance of said generator means and a predetermined energy storage characteristic, said impedance-inverter having a surge impedance, an output impedance having a value substantially matching said surge impedance and coupled to said high frequency signal source, a variable impedance means and means responsive to a video electrical signal source for varying the effective impedance of said means, said variable impedance means being coupled to said high frequency signal source for varying the amplitude of the output signal.

15. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, an output impedance coupled to said high frequency signal source, a plurality of independent variable impedance means coupled to said high frequency signal source for varying the amplitude of the output signal, and means for varying the effective impedance of at least one of said variable impedance means in accordance with a control signal.

16. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, an output impedance, signal transfer means for supplying signal energy from said high frequency signal source to said output impedance, a plurality of independent variable impedance means coupled to said signal transfer means for varying the amplitude of the output signal, and means for varying the effective impedance of at least one of said variable impedance means in accordance with a control signal.

17. In an electrical system, a generator of a high frequency signal of one frequency, said generator having a certain effective internal impedance, an impedance-inverter coupled to said generator for forming a high frequency signal source having an effective internal impedance substantially inversely proportional to the effective internal impedance of said generator, an output impedance, signal transfer means comprising a transmission line for supplying signal energy from said high frequency signal source to said output impedance, a plurality of independent variable impedance means for varying the amplitude of the output signal, said variable impedance means being coupled to said signal transfer means at points electrically spaced by substantially an integral number of quarter wave lengths of said output signal, and means for varying the effective impedance of at least one of said variable impedance means in accordance with a control signal.

18. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, an output impedance, signal transfer means for supplying signal energy from said high frequency signal source to said output impedance, a plurality of independent variable impedance means coupled to said signal transfer means for varying the amplitude of the output signal, means for varying the effective impedance of one of said variable impedance means in accordance with a control signal to thus vary the amplitude of the output signal over a predetermined range, and means for varying the effective impedance of another of said variable impedance means in accordance with another control signal to thus vary the amplitude of the output signal over another predetermined range.

19. In an electrical system, a source of a high frequency signal, an output impedance, a plurality of independent variable impedance means each including an impedance-inverter for varying the amplitude of the output signal, comprising a variable impedance means in shunt with said high frequency signal source, a variable impedance means in shunt with said output impedance and variable impedance means for transferring signal energy from said high frequency signal source to said output impedance, means for varying the effective impedance of said shunt impedance means in accordance with a control signal, and means for varying the effective impedance of said transfer impedance means in accordance with another control signal.

20. In an electrical system, a generator of a high frequency signal, said generator having a certain effective internal impedance, an impedance-inverter coupled to said generator for forming a high frequency signal source having an effective impedance substantially inversely proportional to the effective internal impedance of said generator, an output impedance coupled to said high frequency signal source, controllable means for dissipating electrical energy, a source of control signal for said dissipative means, and a second impedance-inverter connected between said dissipative means and said high frequency signal source, for forming an impedance substantially inversely proportional to the effective impedance of said dissipative means for wave signals having a frequency within a certain range including the frequency of the high frequency signal.

21. In an electrical system, a generator of a high frequency signal, said generator having a certain effective internal impedance, an impedance-inverter coupled to said generator for forming a high frequency signal source having an effective impedance substantially inversely proportional to the effective internal impedance of said generator, an output impedance coupled to said high frequency signal source, controllable means for dissipating electrical energy comprising a plurality of space discharge devices, a source of control signal for said dissipative means, and a second impedance-inverter connected between said dissipative means and said high frequency signal source, for forming an impedance substantially inversely proportional to the effective impedance of said dissipative means for wave signals having a frequency within a certain range including the frequency of the high frequency signal.

22. In an electrical system, a generator of a high frequency signal of one frequency, said generator having a certain effective internal impedance, an impedance-inverter coupled to said generator for forming a high frequency signal source having an effective impedance substantially inversely proportional to the effective internal impedance of said generator, said impedance-inverter comprising a transmission line having an effective electrical length substantially equal to one quarter wave length of said high frequency signal, an output impedance coupled to said high frequency signal source, controllable means for dissipating electrical energy comprising a plurality of space discharge devices, a source of control signal for said dissipative means, and a second impedance-inverter comprising a transmission line having an effective electrical length substantially equal to one quarter wave length of said high frequency signal, said second impedance-inverter being connected between said dissipative means and said high frequency signal source, for forming an impedance substantially inversely proportional to the effective impedance of said dissipative means for wave signals having a frequency within a certain range including the frequency of the high frequency signal.

23. In an absorption modulating system, a source of high frequency signals having a certain impedance, an output impedance coupled to said high frequency signal source, said output impedance being less than the impedance of said source, and means coupled to said high frequency signal source for controllably dissipating energy therefrom to thereby vary continuously the amplitude of the output signal, said means comprising controllable impedance means for dissipating electrical energy, an impedance-inverter, operative at the frequency of the high frequency signal and coupled to said impedance means, for forming a modulating impedance substantially inversely proportional to the effective impedance of said impedance means for wave signals having a frequency within a certain frequency range including the frequency of the said high frequency signal, and a source of a modulating signal for controlling said controllable impedance means.

24. In an absorption modulating system, a source of high frequency signals having a certain impedance, an output impedance coupled to said high frequency signal source, said output impedance being less than the impedance of said source, and means coupled to said high frequency signal source for controllably dissipating energy therefrom to thereby vary continuously the amplitude of the output signal, said means comprising controllable impedance means for dissipating electrical energy, an impedance-inverter comprising a transmission line having an effective electrical length substantially equal to an odd number of quarter wave lengths of a wave signal having a frequency within a certain frequency range including the frequency of said high frequency signal, said impedance-inverter being coupled to said impedance means for forming a modulating impedance substantially inversely proportional to the effective impedance of said impedance means for wave signals having a frequency within said range, and a source of a modulating signal for controlling said controllable impedance means.

25. In an absorption modulating system, a source of high frequency signals having a certain impedance, an output impedance coupled to said high frequency signal source, said output impedance being less than the impedance of said source, and means coupled to said high frequency signal source for controllably dissipating energy therefrom to thereby vary continuously the amplitude of the output signal, said means comprising controllable impedance means for dissipating electrical energy, an impedance-inverter comprising a plurality of reactive elements resonant at one frequency within a certain frequency range including the frequency of said high frequency signal, said impedance-inverter being coupled to said impedance means for forming a modulating impedance substantially inversely proportional to the effective impedance of said impedance means for wave signals having a frequency within said range, and a source of a modulating signal for controlling said controllable impedance means.

26. In an absorption modulating system, a source of high frequency signals having a certain impedance, an output impedance coupled to said high frequency signal source, said output impedance being less than the impedance of said source, and means coupled to said high frequency signal source for controlling dissipating energy therefrom to thereby vary continuously the amplitude of the output signal, said means comprising a plurality of space discharge devices for controllably dissipating electrical energy, each of said space discharge devices having an anode, a cathode, and a control grid; an impedance-inverter operative at the frequency of the high frequency signal and coupled to said devices, for forming a modulating impedance substantially inversely proportional to the effective impedance of said devices for wave signals having a frequency within a certain frequency range including the frequency of the said high frequency signal; means for providing a low impedance path for unidirectional current components between said cathodes and said anodes; and a source of a modulating signal coupled to the grids of said space discharge devices for controlling said dissipative means.

27. In an absorption modulating system; a source of high frequency signals having a certain impedance; an output impedance coupled to said high frequency signal source, said output impedance being less than the impedance of said source; and means coupled to said high frequency signal source for controllably dissipating energy therefrom to thereby vary continuously the amplitude of the output signal, said means comprising a plurality of space discharge devices for controllably dissipating electrical energy, each of said space discharge devices having an anode, a cathode, and a control grid; a connection between said cathodes; a connection between said grids; an impedance-inverter operative at the frequency of the high frequency signal and connected to the anodes of said space discharge devices for forming a modulating impedance substantially inversely proportional to the effective impedance of said devices for wave signals having a frequency within a certain frequency range including the frequency of the said high frequency signal; means for providing a low impedance path for unidirectional current components between said cathodes and said anodes; and a source of a modulating signal connected between said cathodes and said control grids for controlling said dissipative means.

28. In an absorption modulating system, a source of high frequency signals having a certain impedance, an output impedance coupled to said high frequency signal source, said output impedance being less than the impedance of said source, and means coupled to said high frequency signal source for controllably dissipating electrical energy therefrom to thereby vary continuously the amplitude of the output signal, said means comprising controllable space discharge means for dissipating electrical energy and for providing an inherent capacitive reactance; means for providing in shunt with said space discharge means an inductive reactance substantially equal to said capacitive reactance at one frequency within a certain frequency range including the frequency of said high frequency signal; an impedance-inverter, operative at the frequency of the high frequency signal and coupled to said space discharge means, for forming a modulating impedance substantially inversely proportional to the effective impedance of said space discharge means for wave signals having a frequency within said certain frequency range; and a source of a modulating signal for controlling said space discharge means.

29. In an absorption modulating system, a source of high frequency signals having a certain impedance, an output impedance coupled to said high frequency signal source, said output impedance being less than the impedance of said source, and means coupled to said high frequency signal source for controllably dissipating electrical energy therefrom to thereby vary continuously the amplitude of the output signal, said means comprising controllable space discharge means for dissipating electrical energy and for providing an inherent capacitive reactance; an impedance-inverter comprising a transmission line coupled to said space discharge means, said line and said capacitive reactance cooperatively forming an effective transmission line having an electrical length substantially equal to an odd number of quarter wave lengths of a wave signal having a frequency within a certain frequency range including the frequency of said high frequency signal, thus forming a modulating impedance substantially inversely proportional to the effective impedance of said space discharge means for wave signals having a frequency within said certain frequency range; and a source of a modulating signal for controlling said space discharge means.

30. In an electrical system for converting high frequency wave signal energy into modulated carrier wave signal energy, an impedance-inverter, terminating means at one end of said impedance-inverter having a low equivalent internal series impedance which is inverted by means of said impedance-inverter to form a high equivalent impedance at the other end of said inverter, a load impedance less than said high equivalent impedance coupled to said last-mentioned end of said impedance inverter, there being a high frequency current flowing through said terminating means and through said system, a second impedance-inverter coupled to said load impedance, variable impedance means coupled to said second impedance-inverter, said variable impedance being variable in accordance with a modulating signal, and a circuit for applying a modulating signal to said last-mentioned means.

31. In an electrical system for converting high frequency wave signal energy into modulating carrier wave signal energy, an impedance-inverter, terminating means at one end of said impedance-inverter having a low equivalent internal series impedance which is inverted by means of said impedance-inverter to form a high equivalent impedance at the other end of said inverter, a load impedance less than said high equivalent impedance coupled to said last-mentioned end of said impedance inverter, there being a high frequency current flowing through said terminating means and through said system, a second impedance-inverter coupled to said load impedance, said second impedance-inverter having a characteristic impedance greater than said load impedance, variable impedance means coupled to said second impedance-inverter, said variable impedance being variable in accordance with a modulating signal, and a circuit for applying a modulating signal to said last-mentioned means.

32. In an electrical system for converting high frequency wave signal energy into modulated carrier wave signal energy, an impedance-inverter, terminating means at one end of said impedance-inverter having a low equivalent internal series impedance which is inverted by means of said impedance-inverter to form a high equivalent impedance at the other end of said inverter, a load impedance coupled to said last-mentioned end of said impedance inverter, there being a high frequency current flowing through said terminating means and through said system, a second impedance-inverter coupled to said load impedance, said second impedance-inverter having a characteristic impedance greater than the characteristic impedance of said first impedance-inverter, variable impedance means coupled to said second impedance-inverter, said variable impedance being variable in accordance with a modulating signal, and a circuit for applying a modulating signal to said last-mentioned means.

33. In an electrical system for converting high frequency wave signal energy into modulated carrier wave signal energy, an impedance-inverter, terminating means at one end of said impedance-inverter having a low equivalent internal series impedance which is inverted by means of said impedance-inverter to form a high equivalent impedance at the other end of said inverter, a work circuit having a certain impedance, a second impedance-inverter coupling said work circuit to said last-mentioned end of said impedance inverter for transforming the impedance of said work circuit to a load impedance less than said high equivalent impedance, there being a high frequency current flowing through said terminating means and through said system, a third impedance-inverter coupled to said load impedance, variable impedance means coupled to said third impedance-inverter, said variable impedance being variable in accordance with a modulating signal, and a circuit for applying a modulating signal to said last-mentioned means.

34. In a signalling system in combination, a source of wave energy, a load impedance, a line of a length substantially equal to an odd number of quarter wave lengths connecting said source of wave energy to said load impedance for delivering power from said source of wave energy to said load impedance, and an absorbing impedance variable at signal frequency connected in shunt to said line at its point of connection to said load impedance for varying the power supplied from said source to said load impedance at signal frequency.

35. In a signalling system in combination, a source of wave energy of substantially constant voltage, a load impedance, a line the length of which is substantially an odd number of quarter wave lengths of the wave energy of said source, a load impedance effectively connected through said line to said source of wave energy to draw power from said source of wave energy, an electron, discharge device impedance shunting said line at its point of connection to said load, and means for varying the impedance of said device at signal frequency to control the power drawn by said load from said source.

36. In a signalling system, in combination, a source of wave energy, an amplifier having an input coupled to said source, said amplifier having an output, a load impedance, a line of a length substantially equal to an odd number of quarter wave lengths connecting said load impedance to said amplifier output for delivering power from said amplifier to said load impedance, and an impedance variable at signal frequency connected in shunt to said line at its point of connection to said load impedance to vary the power supplied from said source to said load impedance at signal frequency.

37. In a signalling system, in combination, a source of wave energy of relatively high frequency, an antenna system, a line connecting said antenna system to said source of wave energy to deliver power from said source to said antenna system, said line being of electrical length substantially equal to an odd number of quarter wave lengths of the high frequency wave energy of said source, and an electron discharge rectifier having output electrodes effectively in shunt to said line at its point of connection to said antenna and input electrodes controlled by modulating potentials to thereby control the amount of power delivered from said source to said antenna.

38. In a modulation system a source of wave energy of substantially constant voltage, a load impedance, a line connecting said load impedance to said source to deliver wave energy from said source to said load, said line comprising two conductors each of which is substantially an odd number of quarter wave lengths in length, a pair of electron discharge devices each having a control electrode and an anode, circuits effectively coupling said anodes in shunt to said line at the load end thereof, and a source of modulating potentials connected with said control grids to control the impedance of said tubes across said line and thereby control the power delivered from said source to said load.

39. In a signalling system, a source of wave energy of substantially constant alternating current voltage, a load impedance, a line the length of which is substantially equal to an odd number of one-quarter wave lengths, coupling said source to said load impedance, a modulating impedance in shunt to said load impedance, the input impedance of said line being equal to one-half the modulating impedance; the modulating impedance being equal to the load impedance; the modulating impedance and the load impedance being equal to twice the surge impedance of the line, and means for varying the modulating impedance about said normal value at signal frequency to thereby vary in an inverse sense the input impedance of said line and consequently vary the power supplied by said line to said load impedance.

40. In a signalling system a source of wave energy of substantially constant frequency and constant alternating current voltage, an antenna, a transmission line the electrical length of which is substantially equal to an odd number of quarter wave lengths of the wave energy of said source, means coupling said line to said source and to said antenna to transfer wave energy from said source to said antenna, a pair of electron discharge devices having input and output electrodes, means coupling the input electrodes of said devices in phase to a source of modulating potentials, and means coupling the output electrodes of said devices effectively in push-pull relation to said line at its point of connection to said antenna.

41. In a signalling system in combination, a source of wave energy to be modulated, a load impedance, a line the length of which is substantially equal to an odd number of quarter wave lengths of the wave energy of said source connecting the source of wave energy to said load impedance to transfer wave energy from said source to said load impedance, a resistance of an impedance substantially equal to the impedance of said load impedance shunting said line at its point of connection to said load impedance for absorbing a variable amount of wave energy, and means for varying the impedance of said resistance at signal frequency between a low value of impedance and a high value of impedance to vary the power delivered from said source to said load impedance.

42. In a signalling system in combination, a source of wave energy to be modulated, an amplifier having an input coupled to said source, said amplifier having an output, a load impedance, a line the length of which is substantially equal to an odd number of quarter wave lengths of the wave energy of said source connecting the output of said amplifier to said load impedance to transfer wave energy from said amplifier output to said impedance, a resistance of an impedance substantially equal to the impedance of said load impedance for absorbing a variable amount of wave energy from said line shunting said line at its point of connection to said load impedance, and means for varying the impedance of said resistance at signal frequency to vary the power delivered from said amplifier to said load impedance.

43. In a signalling system in combination, a source of wave energy, a load impedance, an impedance-inverter connecting said source of wave energy to said load impedance for delivering power from said source of wave energy to said load impedance, and an absorbing impedance variable at signal frequency connected in shunt to said impedance-inverter at its point of connection to said load impedance for varying the power supplied from said source to said load impedance at signal frequency.

44. In a signalling system in combination, a source of wave energy, a load impedance, an impedance-inverter connecting said source of wave energy to said load impedance for delivering power from said source of wave energy to said load impedance, an absorbing impedance variable at signal frequency, and a second impedance-inverter connecting said absorbing impedance in shunt with first impedance-inverter at the point of connection of the latter to said load impedance, whereby the power supplied from said source to said load impedance is varied at signal frequency.

45. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, a load system coupled to said impedance-inverter, variable impedance means and means responsive to a control signal for varying the effective impedance of said means, said variable impedance means being connected in shunt with said impedance-inverter at its point of connection to said load system for varying the amplitude of the output signal.

46. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, a load impedance coupled to said impedance-inverter, variable impedance means and means responsive to a control signal for varying the effective impedance of said means, said variable impedance means being connected in shunt with said impedance-inverter at its point of connection to said load impedance for varying the amplitude of the output signal.

47. In an electrical system, a generator of a high frequency signal, said generator having a certain effective internal impedance, an impedance-inverter coupled to said generator for forming a high frequency signal source having an effective internal impedance substantially inversely proportional to the effective internal impedance of said generator, said impedance-inverter comprising a transmission line having an effective electrical length substantially equal to an odd number of quarter wave lengths of said signal, a load impedance coupled to said impedance-inverter, variable impedance means and means responsive to a control signal for varying the effective impedance of said means, said variable impedance means being connected in shunt with said line at its point of connection to said load impedance for varying the amplitude of the output signal.

48. In an electrical system, a generator of a high frequency signal, said generator having a certain effective impedance, an impedance-inverter coupled to said generator for forming a high frequency signal source having an effective internal impedance substantially inversely proportional to the effective internal impedance of said generator, said impedance-inverter including a plurality of reactive elements substantially resonant at the signal frequency, a load impedance coupled to said impedance-inverter, variable impedance means and means responsive to a control signal for varying the effective impedance of said means, said variable impedance means being connected in shunt with said impedance-inverter at its point of connection to said load impedance for varying the amplitude of the output signal.

WILLIAM N. PARKER.